Jan. 22, 1957 E. R. WAINSHILBAUM 2,778,973
DAMPER CIRCUIT
Filed Oct. 21, 1955
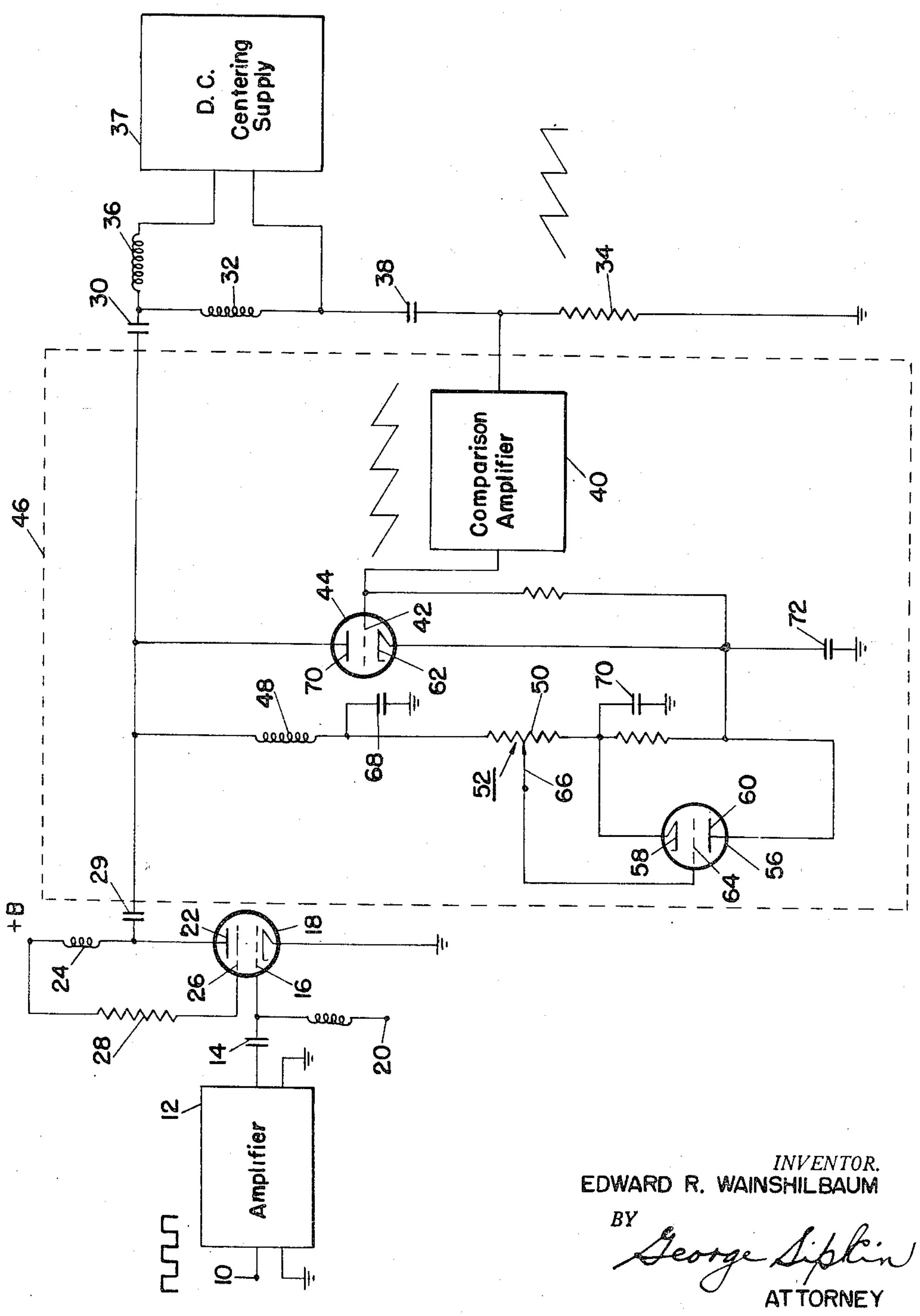
INVENTOR.
EDWARD R. WAINSHILBAUM
BY George Siptin
ATTORNEY United States Patent Office 2,778,973

Patented Jan. 22, 1957

2,778,973

DAMPER CIRCUIT

Edward R. Wainshilbaum, Rockland, Mass., assignor, by mesne assignments, to the United States of America as represented by the Secretary of the Navy Application October 21, 1955, Serial No. 542,113

3 Claims. (Cl. 315—27)

This invention relates to transformerless scanning system for electromagnetically deflected cathode-ray tubes, and in particular to an improved damper circuit for such a scanning system.

The deflection of the electron beam of an electromagnetically deflected cathode-ray tube is proportional to the current through the deflecting coils provided saturation is avoided. If it is desired to deflect the electron beam linearly with time, the current through the deflecting coils must be increased linearly with time. The achieving of a current that increases linearly with time through a deflection coil is not easily accomplished.

It is, therefore, an object of this invention to provide an improved damper circuit for the scanning system of an electromagnetically deflected cathode-ray tube which will increase the linearity of the wave form through the deflecting coils of such tube.

It is a further object of this invention to provide an improved damper circuit which increases the linearity of the first portion of the wave form of current through deflecting coils, which is more sensitive in regulating the wave form, and which is physically compact.

It is a still further object of this invention to provide an improved damper circuit which increases the linearity of the first portion of the current wave form through the deflecting coils and which compensates for changes in the resistance of the components of the damper circuit due to the changes in temperature.

Other objects and advantages of the invention will hereinafter become more fully apparent from the following description when considered in connection with the accompanying drawing.

Positive drive pulses are applied to input terminal 10 of pulse amplifier 12. The positive drive pulses are amplified by amplifier 12 and applied as amplified positive pulses through coupling capacitor 14 to the control grid 16 of driver tube 18. A negative voltage from a suitable source, which is adapted to be connected to terminal 20, biases tube 18 to cutoff. Anode 22 of tube 18 is connected to a suitable source of plate potential through inductor 24. Screen grid 26 of driver tube 18 may be connected to the source of plate potential through dropping resistor 28 or to any other suitable source of potential.

When a positive pulse is applied to control grid 16, tube 18 will conduct heavily during the application of the pulse. At the end of the positive pulse, tube 18 is again cutoff. Energy from the plate circuit of the driver tube 18 is coupled through capacitors 29, 30 to the yoke windings, or deflecting coils 32 of an electromagnetic cathode-ray tube which is not illustrated. Scanning is accomplished while the driver tube 18 is cutoff by the charging toward the potential of the plate voltage of the resistor and inductor circuit comprising inductors 24, 32 and the resistance of inductors 24, 32 together with the resistance of current waveshape sampling resistor 34. Coil 36 is a choke and has a high impedance at the scanning frequency but substantially no impedance to the D. C. from D. C. centering supply 37. The values of capacitors 29, 30 and 38 are so chosen that their reactance at the scanning frequency is small enough to be negligible compared with the reactance of inductors 24, 32.

The wave form of the voltage across resistor 34 is the same as the wave form of the currents through the yoke windings 32. The voltage across wave shape sampling resistor 34 is applied to a conventional comparison amplifier 40 where it is compared with a standard linear saw tooth signal. The difference between the wave form of the current through the yoke windings and that of the standard signal is amplified and applied to the control grid 42 of damper tube 44 of the damper circuit 46 to control the wave form of the current through the yoke windings.

The direct component of the current through damper tube 44 flows through inductor 48, resistor element 50 of potentiometer 52, and fixed resistor 54. Linearity control tube 56 shunts resistor 54 and has its cathode 58 connected between the resistor element 50 and fixed resistor 54. Anode 60 of control tube 56 is connected to cathode 62 of damper tube 44. The control grid 64 of tube 56 is connected to the movable arm 66 of potentiometer 52. Capacitors 68, 70 and 72 have large values of capacitance and act to filter the current in circuit 46.

Variation of the value of the resistance of inductor 48, resistor element 50, fixed resistor 54 or control tube 56 will vary the magnitude of the current through damper tube 44. Variation of the magnitude of this current regulates approximately the first 30% of the wave form of the current wave form through the yoke windings 32. Control of the magnitude of the current through damper tube 44 of the damper circuit 46 is achieved by varying the position of the arm 66 of potentiometer 52 which varies the grid bias of control tube 56 and thus varies the plate resistance of tube 56 and the current which flows therethrough. A minor portion of the total current through the damper tube 44, approximately 10%, in one example, can be diverted through control tube 56 by varying the magnitude of the grid bias. Thus, through the variation of a small amount of current, control of the wave shape of the current through the yoke windings is achieved.

Control tube 56 has an additional function; namely, that of maintaining the current through the damper circuit substantially constant after arm 66 of potentiometer 52 has been placed in a given position. Resistance changes of inductor 48, resistor element 50, and fixed resistor 54 due to changes in temperature, for example, will cause a change in the amount of current flowing through damper tube 44; however, this change of current will change the voltage drop across the resistor element 50 which in turn will change the grid bias of damper tube 56 in a manner to maintain the total current through damper tube 44 substantially constant.

Capacitor 29 isolates the damper circuit 46 from the positive D. C. plate voltage of tube 18. Capacitors 30, 38 isolate the damper circuit 46 and resistor 34 from the D. C. current of centering supply 37 which flows through coils 32, 36. Coil 36 prevents D. C. supply 37 from serving as a shunt to the A. C. flowing through coils 32.

Inductor 48, resistor element 50, resistor 54, control tube 56 with capacitors 68, 70 and 72 form a filter which filters the current flowing through damper tube 44. Anode 70 has applied to it negative pulses which are coupled through capacitor 29 from the plate 22 of tube 18. As the potential of the plate 22 of driver tube 18 increases with time, when tube 18 is cutoff, the current flow through coils 32 increases exponentially since the circuit is essentially an RL circuit. The impedance of tube 44, however, is varied by the difference signal applied to the control grid 44 from comparison amplifier 40. Tube 44, in response to this signal, modifies the current wave form flowing through coils 32 so as to make the increase of current flow through coils 32 more nearly linear, particularly during the first portion of the current wave form. The position of arm 66 of potentiometer 52 determines the magnitude of the current flow through tube 44 and the extent or degree to which the damper circuit 46 affects the wave form of the current through windings 32. Once the position of arm 66 has been determined, or fixed the action of tube 56 is to maintain the total current through the damper tube 44 substantially constant. Thus it can be seen that potentiometer 52 and triode 56 provide efficient and compact means for regulating the current wave form in a scanning circuit.

Obviously many modifications and variations of the present invention are possible in the light of the above teachings. It is therefore to be understood that within the scope of the appended claims the invention may be practiced otherwise than as specifically described.

What is claimed is:

1. In a damper circuit for a transformerless scanning circuit for an electromagnetically deflected cathode-ray tube having a damper tube having an anode, a cathode, and a control grid; the improvements comprising an inductor, the resistor element of a potentiometer and a fixed resistor connected in series with each other and forming a circuit between the plate and cathode of the damper tube, a linearity control tube having an anode, a cathode and a control grid, said control tube being connected to shunt the fixed resistor, the anode of the control tube being connected to the cathode of the damper tube, the cathode of the control tube being connected between the resistor element of the potentiometer and the fixed resistor, and the grid of the control tube being connected to the movable arm of the potentiometer.

2. A damper circuit for a transformerless scanning circuit for an electromagnetically deflected cathode-ray tube comprising a damper tube having an anode, a cathode, and a control grid, circuit means connecting the anode and cathode of the damper tube comprising an inductor, the resistor element of a potentiometer, and a fixed resistor connected in series, a linearity control tube having an anode, a cathode, and a control grid, said linearity control tube being connected to shunt said fixed resistor with the plate of the control tube being connected to the cathode of the damper tube, the grid of the control tube being connected to the movable arm of the potentiometer, and the cathode of the control tube being connected between the resistor element and the fixed resistor, whereby the current through the damper tube is controlled by the positioning of the movable arm of the potentiometer.

3. A damper circuit for a transformerless scanning circuit for an electromagnetically deflected cathode-ray tube comprising a damper tube having an anode, a cathode and a control grid, an inductor, one terminal of the inductor being connected to the anode of the damper tube, a potentiometer having a resistor element and a movable arm, one terminal of the resistor element of the potentiometer being connected to the other terminal of the inductor, a fixed resistor, one terminal of the fixed resistor being connected to the other terminal of the resistor element of the potentiometer and the other terminal of the fixed resistor being connected to the cathode of the damper tube, a first capacitor connected between the inductor and the resistor element of the potentiometer and ground, a second capacitor connected between the resistor element and the fixed resistor and ground, a third capacitor connected between the cathode of the damper tube and ground, a linearity control tube having an anode, a cathode, and a control grid, the cathode of the linearity control tube being connected between the fixed resistor and the resistor element of the potentiometer, the anode of the control tube being connected to the cathode of the damper tube, and the control grid of the control tube being connected to the moveable arm of the potentiometer, said control grid of the damper tube adapted to have applied thereto a signal which is proportional to the difference between the wave form of the circuit through the deflecting coils of the cathode-ray tube and the wave form from a reference source, whereby the linearity of the wave form of the current through the deflection coils is accurately and easily controlled.

References Cited in the file of this patent

UNITED STATES PATENTS

| | | |
|---|---|---|
| 2,482,737 | Shaw | Sept. 20, 1949 |
| 2,598,134 | Schade | May 27, 1952 |
| 2,655,615 | Seldin | Oct. 13, 1953 |
| 2,694,161 | Holst | Nov. 9, 1954 |
| 2,741,723 | Pacini | Apr. 10, 1956 |